(12) United States Patent
Nelson et al.

(10) Patent No.: US 7,841,780 B2
(45) Date of Patent: Nov. 30, 2010

(54) OPTICAL MODULE FOR A HOST OPTICAL DEVICE

(75) Inventors: Stephen T. Nelson, Santa Clara, CA (US); Greta L. Light, San Mateo, CA (US); Donald A. Blackwell, Saratoga, CA (US)

(73) Assignee: Finisar Corporation, Sunnyvale, CA (US)

( * ) Notice: Subject to any disclaimer, the term of this patent is extended or adjusted under 35 U.S.C. 154(b) by 638 days.

(21) Appl. No.: 11/757,285

(22) Filed: Jun. 1, 2007

(65) Prior Publication Data

US 2007/0280606 A1 Dec. 6, 2007

Related U.S. Application Data

(60) Provisional application No. 60/803,775, filed on Jun. 2, 2006, provisional application No. 60/803,776, filed on Jun. 2, 2006.

(51) Int. Cl.
*G02B 6/36* (2006.01)
(52) U.S. Cl. .......................................... 385/92; 385/88
(58) Field of Classification Search ............... 385/88–94
See application file for complete search history.

(56) References Cited

U.S. PATENT DOCUMENTS 7,013,088 B1 * 3/2006 Jiang et al. .................. 398/139

* cited by examiner

*Primary Examiner*—Kevin S Wood
(74) *Attorney, Agent, or Firm*—Workman Nydegger

(57) ABSTRACT

Optical modules for use with a host system. In one example embodiment, a method for tapping an optical network includes connecting one or more optical modules to a host device, providing one or more post amplifiers, and controlling each of the one or more optical modules and the one or more post amplifiers with a microprocessor that is integrated with the host device. In this example method, the one or more optical modules include at least one optical module with a plurality of ROSAs and the post amplifiers amplify electrical signals generated by the ROSAs.

20 Claims, 2 Drawing Sheets

OPTICAL MODULE FOR A HOST OPTICAL DEVICE

CROSS-REFERENCE TO A RELATED APPLICATION

This application claims priority to U.S. Provisional Patent Application Ser. No. 60/803,776, filed on Jun. 2, 2006, which is incorporated herein by reference in its entirety. This application also claims priority to U.S. Provisional Patent Application Ser. No. 60/803,775, filed on Jun. 2, 2006, which is also incorporated herein by reference in its entirety.

BACKGROUND

1. The Field of the Invention

The present invention relates to optical modules for use in optical devices. More particularly, embodiments of the invention relate to optical receiver modules, optical transmitter modules, and optical transceiver modules for use with a host system.

2. Related Technology

A typical optical transceiver is a device that includes both a receiving optical subassembly ("ROSA") and a transmitting optical subassembly ("TOSA"). The ROSA receives a light signal with a photodiode or other light detector, which converts the light signal into an electrical signal. The electrical signal is then amplified and further processed for use by the receiving device. The TOSA typically includes a laser that generates light that is launched into the optical network. When a device desires to transmit data, the light emitted by the laser is modulated accordingly. Thus, the data carried by the light signal often originates as an electrical signal and the conversion of an electrical signal into a light signal is usually accomplished using the laser in the TOSA.

A typical transceiver includes a TOSA, a ROSA, and a printed circuit board that includes a microcontroller, a laser driver, and a post-amplifier. Each component of a typical transceiver adds cost and complexity to the manufacture of the transceiver. For certain optical devices, one or more components in a transceiver go unused, or are redundant, and are therefore unnecessary.

One example of an optical device where certain components of a typical transceiver go unused is an optical network test access point ("TAP") device. In general, a TAP device is a device that includes various connections by way of which a user can gain access to a network data stream for the purpose of performing monitoring and testing evolutions. Other devices can interface with the TAP device so as to monitor connections of the network in which the TAP device is employed.

A significant problem with a typical TAP device relates to the transceivers and ports by way of which the TAP device receives and sends optical data. In particular, a typical TAP device includes one transceiver connected to each port. In other words, a typical TAP device has one ROSA for each TOSA. However, a typical TAP device can require more ROSAs than TOSAs for a given application. Therefore, some of the TOSAs associated with the transceivers that are integrated into the TAP device are not fully utilized.

That is, for a transceiver connected to an input port of a TAP device, for example, only the receiver side of that transceiver that may be utilized where the port is input-only, and the transmitter side of that transceiver will necessarily be idle. Similarly, for a transceiver connected to an output port of a TAP device, only the transmitter side of that transceiver that may be utilized where the port is output-only, and the receiver side of that transceiver will necessarily be idle. Consequently, the purchaser of such a TAP device is compelled to pay for unused components and unused functionality.

Another problem with a typical TAP device is redundancy of components resulting in increased cost. In order for an optical component such as a ROSA or a TOSA to function properly, certain components (e.g., microprocessor, laser driver, post amplifier) are needed. Thus, each transceiver in a conventional TAP device includes a printed circuit board on which are mounted the necessary components. In other words, the components needed to operate the ROSAs and TOSAs are duplicated in each transceiver. The duplication of components adds cost and complexity to the TAP device.

BRIEF SUMMARY OF SOME EXAMPLE EMBODIMENTS

In general, example embodiments of the invention relate to optical modules for use in host systems and, more particularly, to optical modules that enable the number of optical receivers to vary relative to optical transmitters. In particular, example embodiments of the present invention relates to optical receiver modules, optical transmitter modules, and optical transceiver modules that interface with a host system that provides control circuitry to control the optical modules.

In one example embodiment, an optical transceiver module includes a ROSA, a first lead frame electrically connected to the ROSA, a TOSA, and a second lead frame electrically connected to the TOSA. The ROSA is configured to receive an optical signal and deliver the optical signal as an electrical signal to a host device for processing including amplification by a post amplifier of the host device. The TOSA is configured to transmit an optical signal based on an electrical signal received from the host device. The first lead frame is configured to be electrically connected to a post amplifier and the second lead frame is configured to be electrically connected to a laser driver. Both the post amplifier and the laser driver are integrated into a host printed circuit board of the host device. The host printed circuit board includes a microprocessor configured to control the post amplifier and the laser driver.

In another example embodiment, an optical receiver module includes a first ROSA, a first lead frame electrically connected to the first ROSA, a second ROSA, and a second lead frame electrically connected to the second ROSA. The first ROSA is configured to deliver a first electrical signal to a host device. The second ROSA is configured to deliver a second electrical signal to the host device. The first lead frame is configured to be electrically connected to a first post amplifier configured to amplify the first electrical signal. The second lead frame is configured to be electrically connected to a second post amplifier configured to amplify the second electrical signal. The first and second post amplifiers are integrated into a host printed circuit board of the host device. The host printed circuit board includes a microprocessor configured to control the first and second post amplifiers.

In yet another example embodiment, an optical transmitter module includes a first TOSA, a first lead frame electrically connected to the first TOSA, a second TOSA, and a second lead frame electrically connected to the second TOSA. The first lead frame is configured to be electrically connected to a first laser driver and the second lead frame is configured to be electrically connected to a second laser driver. The first and second laser drivers are integrated into a host printed circuit board of a host device. The host printed circuit board includes a microprocessor configured to control the first and second laser drivers.

In another example embodiment, a method for tapping an optical network includes connecting one or more optical modules to a host device, providing one or more post amplifiers, and controlling each of the one or more optical modules and the one or more post amplifiers with a microprocessor that is integrated with the host device. In this example method, the one or more optical modules include at least one optical module with a plurality of ROSAs. Also, the post amplifiers amplify electrical signals generated by the ROSAs.

These and other aspects of example embodiments of the present invention will become more fully apparent from the following description and appended claims.

BRIEF DESCRIPTION OF THE DRAWINGS

To further clarify the above and other aspects of example embodiments of the present invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention nor are they necessarily drawn to scale. Example embodiments of the invention will be disclosed and explained with additional specificity and detail through the use of the accompanying drawings in which.

DETAILED DESCRIPTION OF SOME EXAMPLE EMBODIMENTS

Embodiments of the invention relate to an optical module for use in a host system or in a TAP device. In particular, embodiments of the invention relate to optical receiver modules, optical transmitter modules, and optical transceiver modules that decrease the cost and complexity of a host device, such as an optical network TAP device, into which the optical modules are assembled. Embodiments of the invention enable the number of optical receivers and optical transmitters in a TAP device to vary and be configured according to need.

Figure 1:
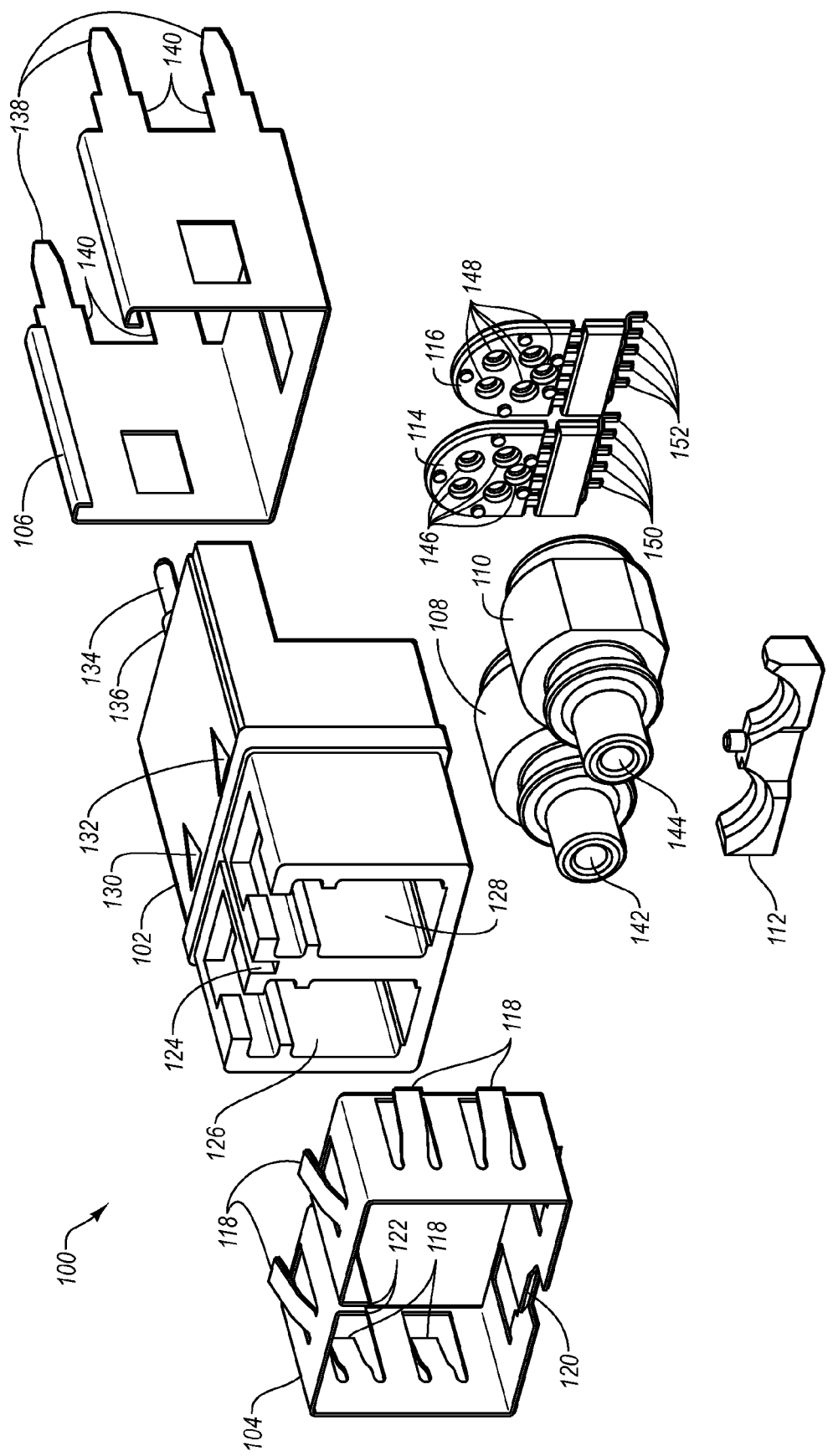
FIG. 1 illustrates an exploded view of an example optical module.

FIG. 1 illustrates an exploded view of an example optical module 100. The optical receiver module 100 can conform with any desired form factor. For example, the optical receiver module 100 can substantially conform with the SFF form factor, the SFP form factor, or the XFP form factor, among others. However, the scope of the invention is not limited to an optical receiver module conforming with any particular form factor.

The optical module 100 includes a shell 102, an electromagnetic interference ("EMI") shield 104, and an enclosure 106. The EMI shield 104 fits over the front of the shell 102, and the enclosure 106 fits over the back of the shell 102. The optical module 100 is configured as an optical receiver module and therefore includes two receiver optical subassemblies ("ROSAs") 108 and 110. As discussed below, however, the optical module 100 can be configured as an optical transmitter module and include instead two transmitter optical subassemblies ("TOSAs") instead of two ROSAs. Likewise, the optical module 100 can be configured as an optical transceiver module and include one ROSA and one TOSA instead of two ROSAs. ROSAs 108 and 110 are configured to fit within shell 102. The optical module 100 also includes a port retention bar 112 and lead frames 114 and 116.

The EMI shield 104 includes EMI springs 118. The EMI springs 118 are designed to make contact to the front bezel of a host device and provide an electrical contact for preventing currents from building up and generating electromagnetic emissions. The EMI shield 104 also includes a spring 120 which makes contact with the shell 102 when the EMI shield 104 is operably connected to the shell 102. The EMI shield 104 also includes tabs 122 which slide into a slot 124 when the EMI shield 104 is operably connected to the shell 102. The EMI shield 104 can be made from stainless steel, sheet metal or another suitable material.

The shell 102 includes LC optical ports 126 and 128. The shell 102 also includes data flow direction indicators 130 and 132 which point in the direction that data is flowing through the ports 126 and 128. Since the optical module 100 is configured as an optical receiver module, the indicators 130 and 132 both point inward from the ports 126 and 128 to indicate that data is flowing into the ports 126 and 128 of the optical module 100. If the optical module 100 were configured as an optical transmitter module, the indicators 130 and 132 would point in the opposite direction. Likewise, if the optical module 100 were configured as an optical transceiver module, one of the indicators 130 and 132 would point in the opposite direction.

The shell 102 also includes a post 134 which can be used to attach the shell 102 to a host printed circuit board of a host device (not shown). The post 134 includes a region 136 with an expanded diameter that acts as a stand-off to hold the shell 102 an appropriate distance from the host printed circuit board to which the shell 102 becomes attached. This appropriate distance is at least partially determined by the physical proximity of the lead frames 114 and 116 to the host printed circuit board to which the shell 102 becomes attached. The shell 102 can be casted out of a metallic alloy material that is electrically conductive. Alternatively, the shell 102 can be made out of a plastic material.

The enclosure 106 is configured to slide onto the back of the shell 102 after all other components of the optical module 100 are in place. The enclosure 106 functions to support other components of the optical module 100 in place. The enclosure 106 includes posts 138 which serve a similar function to the post 134 described above in that they are used to attach the shell 102 to a host printed circuit board of a host device. Also similar to the post 134 are wider regions 140 of the posts 138 which also act as stand-offs to hold the shell 102 an appropriate distance from the host printed circuit board to which it becomes attached. The enclosure 106 can be made from stainless steel, sheet metal or another suitable material.

The ROSAs 108 and 110 include ports 142 and 144, respectively. When operably assembled within the shell 102, the port 142 of the ROSA 108 extends into the port 126 of the shell 102 and the port 144 of the ROSA 110 extends into the port 128 of the shell 102. The ROSAs 108 and 110 each function by receiving optical light signals through the ports 142 and 144, respectively, with a photodiode or other light detector and converting the optical signals into electrical signals. The electrical signal then generally requires amplification by a post amplifier in order to be used by a receiving host device. However, the optical module 100 does not include any post amplifier in one embodiment. Instead, the ROSAs 108 and 110 are configured to be electrically connected, as described below, to two post amplifiers that are integrated into a host printed circuit board of a host device. The host printed circuit board includes a microprocessor configured to control the post amplifiers. A host device using the optical module 100 can be manufactured less expensively due to the fact that no microcontroller or microprocessor is needed in the optical module 100 because these components are already provided on the host device. An example of one such host device is the optical network TAP device 200 disclosed in co-pending U.S. patent application Ser. No. 11/757,276, titled "OPTICAL NETWORK TEST ACCESS POINT DEVICE," which is filed concurrently herewith and incorporated herein by reference in its entirety.

If the optical module 100 were an optical transmitter module instead of an optical receiver module, the ROSAs 108 and 110 would be replaced with a pair of TOSAs. In general, a TOSA typically includes a laser that generates light that can be launched into an optical network. When a host device desires to transmit data, the light emitted by the laser is modulated accordingly using a laser driver. Thus, the data carried by the light signal often originates as an electrical signal and the conversion of an electrical signal into a light signal is usually accomplished using a laser in a TOSA. However, if the optical module 100 were an optical transmitter module, it would not include any laser driver in one embodiment. Instead, the pair of TOSAs would be configured to be electrically connected, as described below, to two laser drivers that are integrated into a host printed circuit board of a host device. The host printed circuit board includes a microprocessor configured to control the laser drivers. A host device using an optical transmitter module embodiment of the optical module 100 can be manufactured less expensively due to the fact that no printed circuit board or microcontroller or microprocessor is needed in the optical module 100 because these components are already provided on the host device.

Similarly, if the optical module 100 were an optical transceiver module instead of an optical receiver module, one of the ROSAs 108 and 110 would be replaced with a TOSA. As discussed above, if the optical module 100 were an optical transceiver module, it would not include any post amplifier or laser driver in one embodiment. Instead, the ROSA and the TOSA would be configured to be electrically connected, as described below, to a post amplifier and a laser driver, respectively, that are integrated into a host printed circuit board of a host device (not shown). The host printed circuit board includes a microprocessor configured to control the post amplifier and the laser drivers. A host device using an optical transceiver module embodiment of the optical module 100 can be manufactured less expensively due to the fact that no printed circuit board or microcontroller or microprocessor is needed in optical module 100 because these components are already provided on the host device.

Returning to FIG. 1, the port retention bar ("PRB") 112 interlocks into the shell 102 and functions to hold the ROSAs 108 and 110 in place. The PRB 112 also finishes a complete metal surrounding of the ROSAs 108 and 110 and therefore has an EMI shielding function as well.

The Lead frames 114 and 116 include the holes 146 and 148, respectively, through which electrical posts from the ROSAs 108 and 110 extend, as shown and discussed in connection with FIG. 2 below. The lead frames 114 also include pins 150 and 152 which are configured to attach to a host printed circuit board of a host device. The holes 146 and the pins 150 function as a bridge to provide electrical communication between the ROSA 108 and the host printed circuit board to which the pins 150 become operably connected. Similarly, the holes 148 and the pins 152 function to provide electrical communication between the ROSA 110 and the host printed circuit board to which the pins 152 become operably connected.

Where the host printed circuit board includes a microprocessor or microcontroller and post amplifiers or laser drivers, as discussed above, the lead frames 114 and 116 are configured to be electrically connected to the post amplifiers and the laser drivers, which in turn facilitates an electrical connection between the ROSAs 108 and 110 to the post amplifiers, or in the case where one or both of the ROSAs 108 and 110 are replaced with a TOSA or TOSAs, facilitates an electrical connection between the TOSA or TOSAs and the laser driver or drivers.

Figure 2:
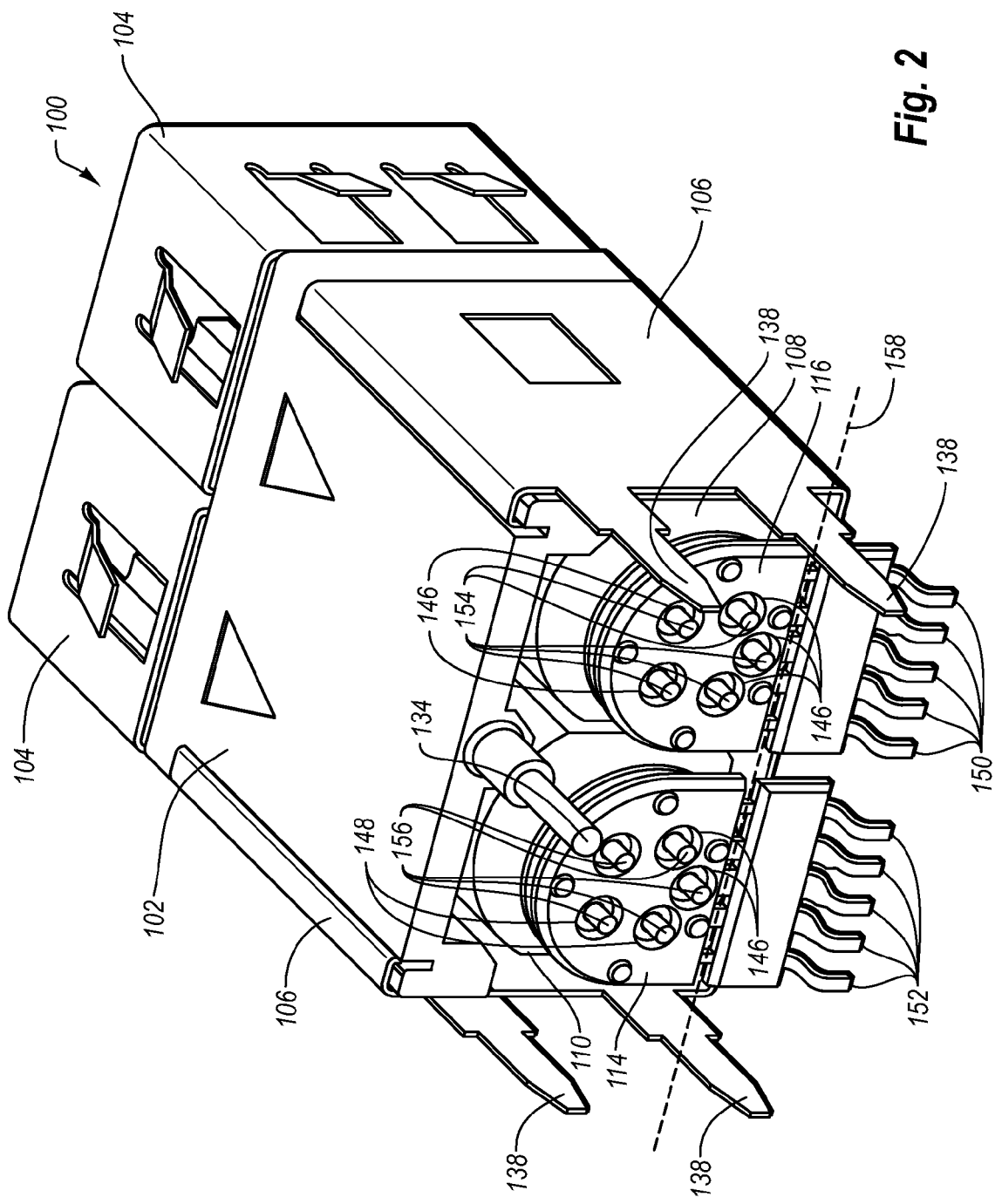
FIG. 2 illustrates a front perspective view of the example optical module of FIG. 1.

Turning now to FIG. 2, a back perspective view of the optical module 100 of FIG. 1 is illustrated. Unlike FIG. 1 which shows the optical module 100 in an exploded state, FIG. 2 shows the optical module 100 in an operably assembled state. FIG. 2 shows the ROSAs 108 and 110 positioned within the shell 102. FIG. 2 also shows the EMI shield 104 and the enclosure 106 operably connected to the shell 102. FIG. 2 also shows electrical posts 154 of the ROSA 108 extending through the holes 146 of the lead frame 114. Likewise, FIG. 2 shows electrical posts 156 of the ROSA 110 extending through the holes 148 of the lead frame 116.

Each of the electrical posts 154 and 156 is electrically connected to one of the pins 150 or 152, respectively. As optical signals enter the ROSAs 108 and 110, they are converted into electrical signals, which then travel through the posts 154 and 156 and the pins 150 and 152 into a host printed circuit board of a host device when the optical module 100 is operably connected to the host printed circuit board of the host device. The lead frames 114 and 116 are configured to be bent, if necessary, along line 158 between 0 and 90 degrees. The posts 134 and 138 can also be configured to extend at various angles with respect to the length of the optical module 100, depending on the needs of the specific application for which the optical module 100 is being used. Although the embodiment of the optical module 100 illustrated in FIGS. 1 and 2 includes two LC optical ports, other embodiments of the optical module 100 can include only one receiver or transmitter port or more than two receiver or transmitter ports. Similarly, other types of optical port configurations other than LC optical ports can be utilized in the optical module 100.

Although the optical module 100 can be integrated into an optical network TAP device, as discussed above, embodiments of the optical module 100 can also be integrated into other optical devices, such as network switches or network routers. Since the optical module 100 can have the form factor of a typical transceiver, it can easily be integrated into a host device that is designed for standard optical transceiver modules. Where the host device currently does not use either the receiver or the transmitter component of a certain transceiver, replacing the transceiver with an optical receiver module embodiment or optical transmitter module embodiment of the optical module 100 can save overall cost and complexity of the host device because the unnecessary receiver or transmitter is eliminated and replaced with a transmitter or receiver that can be used by the host device.

Likewise, where a host device that includes a printed circuit board with a microcontroller or microprocessor capable of supporting laser drivers and post amplifiers, replacing a transceiver of the host device with a transceiver embodiment of the optical module 100 can save the cost and complexity associated with integrating a printed circuit board and a microcontroller into a typical transceiver. Similarly, an optical receiver module or an optical transmitter module as described herein can save overall cost and complexity by eliminating a redundant printed circuit board and microcontroller or microprocessor.

The example optical module 100 is less expensive to produce than a typical transceiver because the driving capabilities and amplification functions are handled by the host printed circuit board of the host device or system to which the optical module 100 becomes connected. The example optical module 100 is particularly advantageous when integrated into an optical device that requires few transmitter and many receivers. The example optical module 100 can provide an optical device manufacturer with only necessary and non-redundant components in an optical module that does not include a printed circuit board and microcontroller or microprocessor. The example optical module 100 also eliminates the cost of other electrical connectors that run between the optical ROSA and TOSA and the printed circuit board included in typical transceivers. The elimination of electrical connectors results in better signal quality because the electrical connection between a typical transceiver printed circuit board and a host printed circuit board can cause discontinuity and degrade the performance of electrical signals.

In another embodiment, the optical modules are configured to detachably connect with the host system. This enables the ratio of the TOSAs to ROSAs to be changed as required. Further, replaceable optical modules also enables damaged optical modules to be quickly replaced at reduced cost. In one embodiment, each of the optical modules may include a printed circuit board that is received by a corresponding connector on the host printed circuit board. This ensures that the optical modules are pluggable in one embodiment.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical transceiver module comprising:
   a ROSA configured to receive an optical signal and deliver the optical signal as an electrical signal to a host device for processing including amplification by a post amplifier of the host device;
   a first lead frame electrically connected to the ROSA;
   a TOSA configured to transmit an optical signal based on an electrical signal received from the host device; and
   a second lead frame electrically connected to the TOSA;
   wherein the first lead frame is configured to be electrically connected to a post amplifier and the second lead frame is configured to be electrically connected to a laser driver, the post amplifier and the laser driver being integrated into a host printed circuit board of the host device, the host printed circuit board including a microprocessor configured to control the post amplifier and the laser driver.

2. The optical transceiver module as recited in claim 1, further comprising an EMI shield at least partially surrounding a port of the ROSA and a port of the TOSA.

3. The optical transceiver module as recited in claim 1, further comprising a shell at least partially surrounding the ROSA and the TOSA.

4. The optical transceiver module as recited in claim 3, wherein the shell includes visual indicators that show the direction of optical data flow with respect to a port of the ROSA and a port of the TOSA.

5. The optical transceiver module as recited in claim 3, wherein the shell includes at least one post that can be connected to the host printed circuit board.

6. The optical transceiver module as recited in claim 3, further comprising an enclosure at least partially surrounding the shell.

7. The optical transceiver module as recited in claim 6, wherein the enclosure includes at least one post that can be used to connect the enclosure to the host printed circuit board.

8. The optical transceiver module as recited in claim 1, further comprising a connector that is pluggable into a corresponding connector mounted on the host printed circuit board, wherein the connector provides an electrical connection between the TOSA and the laser driver and between the ROSA and the post amplifier.

9. The optical transceiver module as recited in claim 1, wherein the first lead frame includes pins that are configured to be attached directly to the host printed circuit board, and the second lead frame includes pins that are configured to be attached directly to the host printed circuit board.

10. The optical transceiver module as recited in claim 2, wherein the EMI shield does not at least partially surround any portion of the host printed circuit board.

11. An optical receiver module comprising:
    a first ROSA configured to deliver a first electrical signal to a host device;
    a first lead frame electrically connected to the first ROSA;
    a second ROSA configured to deliver a second electrical signal to the host device; and
    a second lead frame electrically connected to the second ROSA;
    wherein the first lead frame is configured to be electrically connected to a first post amplifier configured to amplify the first electrical signal and the second lead frame is configured to be electrically connected to a second post amplifier configured to amplify the second electrical signal, the first and second post amplifiers being integrated into a host printed circuit board of the host device, the host printed circuit board comprising a microprocessor configured to control the first and second post amplifiers.

12. The optical receiver module as recited in claim 11, further comprising an EMI shield at least partially surrounding a port of the first ROSA and a port of the second ROSA.

13. The optical receiver module as recited in claim 11, further comprising a shell at least partially surround the first ROSA and the second ROSA.

14. The optical receiver module as recited in claim 13, wherein the shell includes visual indicators that show the direction of optical data flow with respect to a port of the first ROSA and a port of the second ROSA.

15. The optical receiver module as recited in claim 13, wherein the shell includes at least one post that can be connected to the host printed circuit board.

16. The optical receiver module as recited in claim 11, further comprising an enclosure at least partially surrounding the shell and wherein the enclosure includes at least one post that can be used to connect the enclosure to the host printed circuit board.

17. The optical receiver module as recited in claim 11, further comprising a pluggable connector adapted to detachably connect with a corresponding connector mounted on the host printed circuit board.

18. The optical transceiver module as recited in claim 12, wherein the EMI shield does not at least partially surround any portion of the host printed circuit board.

19. A method for tapping an optical network, the method comprising:
- connecting one or more optical modules to a host device, wherein the one or more optical modules include at least one optical module with a plurality of ROSAs;
- providing one or more post amplifiers to amplify electrical signals generated by ROSAs included in the one or more optical modules, the one or more post amplifiers integrated with the host device; and
- controlling each of the one or more optical modules and the one or more post amplifiers with a microprocessor that is integrated with the host device.

20. The method of claim 19, wherein connecting one or more optical modules to a host device further comprises detachably connecting the one or more optical modules to the host device.

* * * * *